United States Patent [19]

Spokas

[11] 4,142,619
[45] Mar. 6, 1979

[54] DUMP VALVE FOR WET CLUTCH

[75] Inventor: Romas B. Spokas, Rockford, Ill.

[73] Assignee: Borg-Warner Corporation, Chicago, Ill.

[21] Appl. No.: 722,935

[22] Filed: Sep. 13, 1976

[51] Int. Cl.² ............................................. F16D 13/72
[52] U.S. Cl. .............................. 192/113 B; 192/13 R
[58] Field of Search ......................... 192/113 B, 13 R

[56] References Cited

U.S. PATENT DOCUMENTS

| | | | |
|---|---|---|---|
| 3,033,327 | 5/1962 | Kelley | 188/264 |
| 3,157,257 | 11/1964 | Root | 192/113 B X |
| 3,176,813 | 4/1965 | Lee et al. | 192/113 B X |
| 3,314,513 | 4/1967 | Lake et al. | 192/91 |
| 3,334,717 | 8/1967 | Spokas et al. | 192/113 B |
| 3,351,169 | 11/1967 | McIndoe | 192/85 |
| 3,540,557 | 11/1970 | Hasselbacher et al. | 192/113 B X |
| 3,722,647 | 3/1973 | Kraus et al. | 192/113 B |
| 3,749,217 | 7/1973 | Bush et al. | 192/113 B |
| 3,773,157 | 11/1973 | Koch, Jr. et al. | 192/113 B |

*Primary Examiner*—William F. O'Dea
*Assistant Examiner*—Harold Joyce
*Attorney, Agent, or Firm*—Robert L. Zieg

[57] ABSTRACT

A dump valve mechanism for a wet clutch wherein the clutch includes a plurality of friction elements supplied with lubricating and cooling oil when the clutch is engaged and including a fluid pumping means as a part of a release mechanism, the release mechanism being axially movable to a position engaging a brake for a transmission input shaft. The dump valve is defined by a pair of annular surfaces which are opened and separated when the brake is engaged due to relative movement between parts of the release mechanism to divert the lubricant and cooling fluid from the clutch discs as the brake is applied to prevent viscous drag from providing unwanted drive between the friction elements when the clutch is disengaged.

11 Claims, 4 Drawing Figures

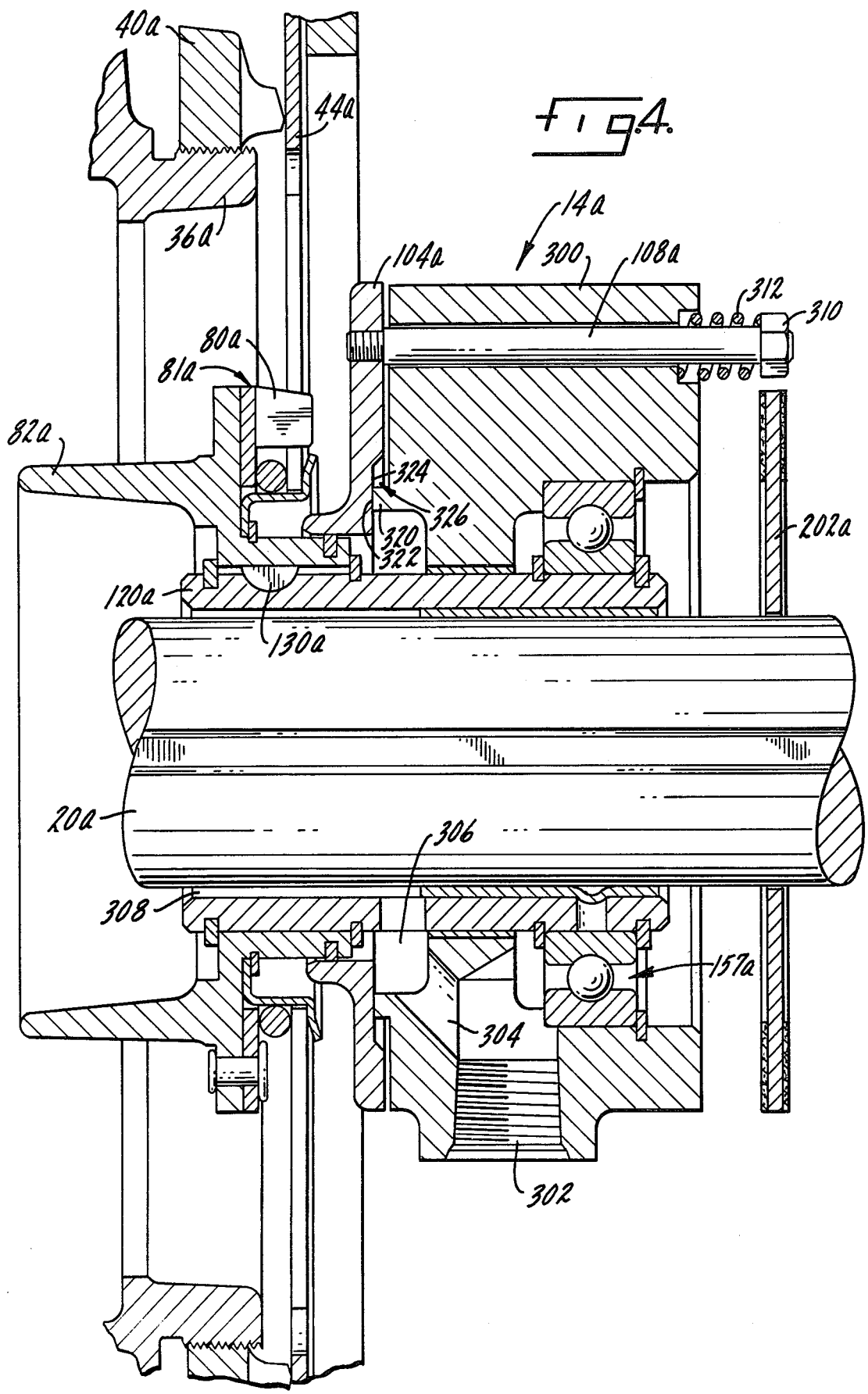

4,142,619

DUMP VALVE FOR WET CLUTCH

BACKGROUND OF THE INVENTION

In wet clutch structures known in the prior art, means have been provided to eliminate the viscous drag which arises during clutch disengagement. This viscous drag is undesirable in that it will create unwanted driving input to the transmission input shaft or the output means from the clutch during disengagement. When a brake is used to hold the output shaft stationary, inefficiencies are created by the viscous drag due to the excess of lubricant and cooling fluid between the clutch plates while the brake is applied. The problems encountered in trying to prevent viscous drag are that complicated structures are normally involved which provide a release of the oil flow to the clutch either manually or automatically at a given time. The timing of this diversion of the lubricant and cooling flow is critical and must be in a proper relationship to the engagement of the clutch and the application of the brake. In addition, provision must be provided such that the oil will follow the diversion path rather than some of the oil continuing to flow to the clutch mechanism and create the viscous drag.

SUMMARY OF THE INVENTION

The present invention alleviates the above-enumerated difficulties by providing a dump value of a type which is annular in shape providing a very large fluid passage area and in a rotating area of the clutch where there will be some centrifugal force present, whereby substantially all of the lubricant and cooling fluid will follow the path through the dump valve and thus completely eliminate the viscous drag problem. In addition, the present invention provides a dump valve properly timed in that the valve in one configuration is operated after the brake mechanism is contacted by relative movement between the pump body and a valve plate connected to the brake engaging plate. In another embodiment, a desirable feature is provided in that a variable length of spacer may be used whereby the dump valve can be actuated just prior to application of the brake which is important in certain installations where it is desirable to be sure there is no viscous drag present as the brake is being applied which could result in some torque buildup being locked in the system after the brake is applied.

BRIEF DESCRIPTION OF THE DRAWINGS

FIG. 4 is a modified form of release mechanism adapted to replace that illustrated in FIGS. 1 and 3.

DETAILED DESCRIPTION

Figure 1:
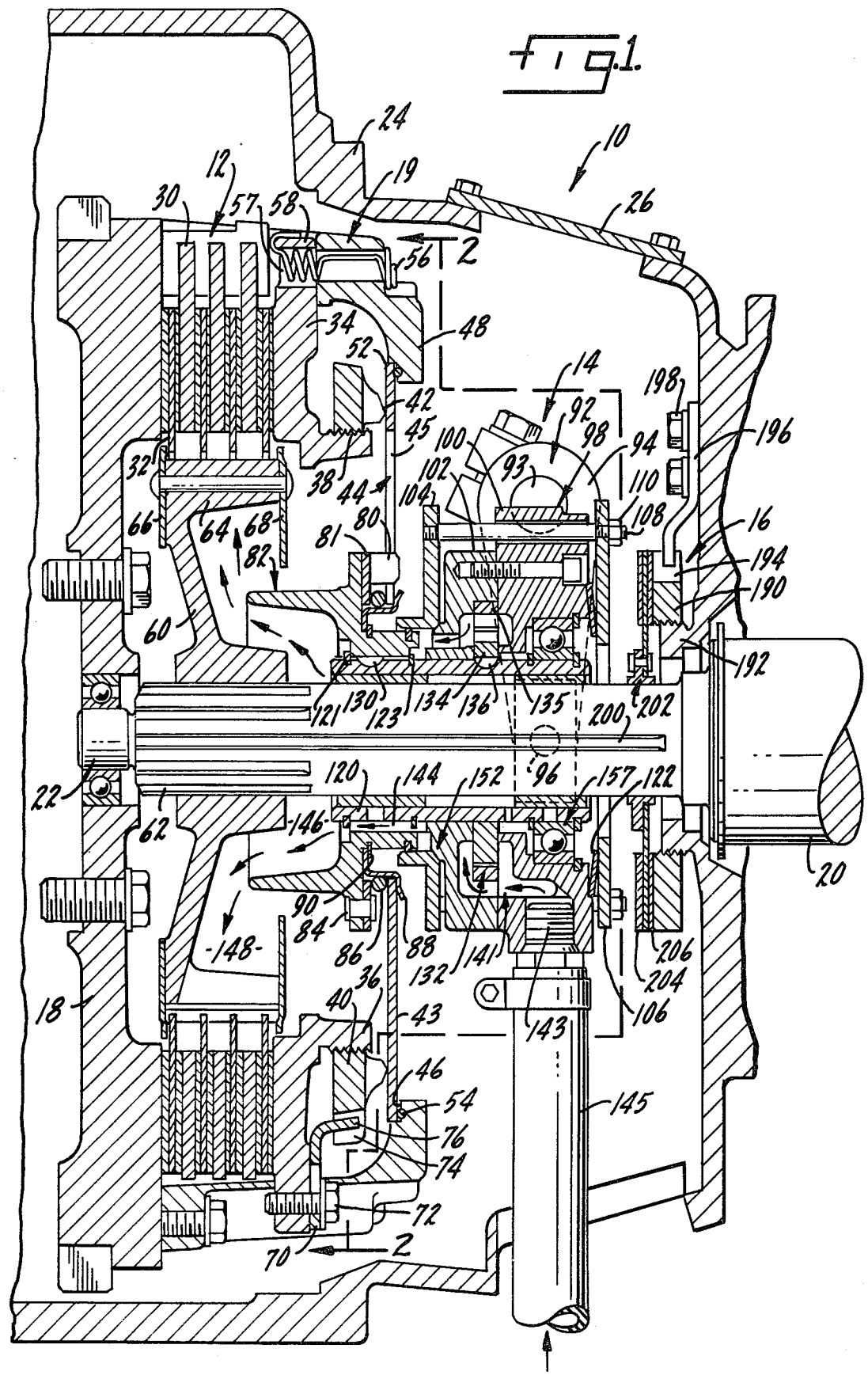
FIG. 1 is a cross-sectional view taken along the lines 1—1 of FIG. 2.

Referring to FIG. 1, there is illustrated a unique wet clutch arrangement 10 adapted to provide a drive connection between an engine and a transmission. Clutch mechanism 10 is generally comprised of a friction clutch section 12, a release mechanism 14 and a brake mechanism 16. In addition, there is provided within clutch mechanism 12 a flywheel member 18 adapted to be connected to a driving engine and connected to a cover assembly 19. Centrally located in clutch 10 is a transmission input shaft or clutch output means 20 which is piloted within flywheel 18 by a pilot bearing 22 on shaft 20. A housing member 24 is provided enclosing clutch 10, housing 24 being provided with an access plate 26.

Clutch section 12 includes a plurality of outer or driving discs 30 drivingly connected to cover assembly 19 and rotating therewith. Interleaved between discs 30 are a series of inner or driven discs 32 having friction surfaces thereon. Adapted to engage the plurality of discs 30 and 32 is a pressure plate 34 having an axial extension 36 which is threaded at 38 to receive an adjustable threaded clutch ring 40. Clutch ring 40 has a nose portion or ridge 42 which is in engagement with a slotted diaphragm spring 44. Spring 44 is comprised of a series of spring fingers 43 separated by radial slots 45. Spring 44 is mounted within a bore 46 provided in a clutch backing ring 48 which is secured to the clutch cover assembly 19. Spring 44 has an outer circular periphery 52 received within bore 46. Adjacent the outer periphery 52 of spring 44 is a pivot ring 54 in bore 46 engaged by spring 44. Secured within cover assembly 19 is a series of return springs 56 which extend through a bore 57 in pressure plate 34 and hook over a nose portion 58 on pressure plate 34.

Figure 2:
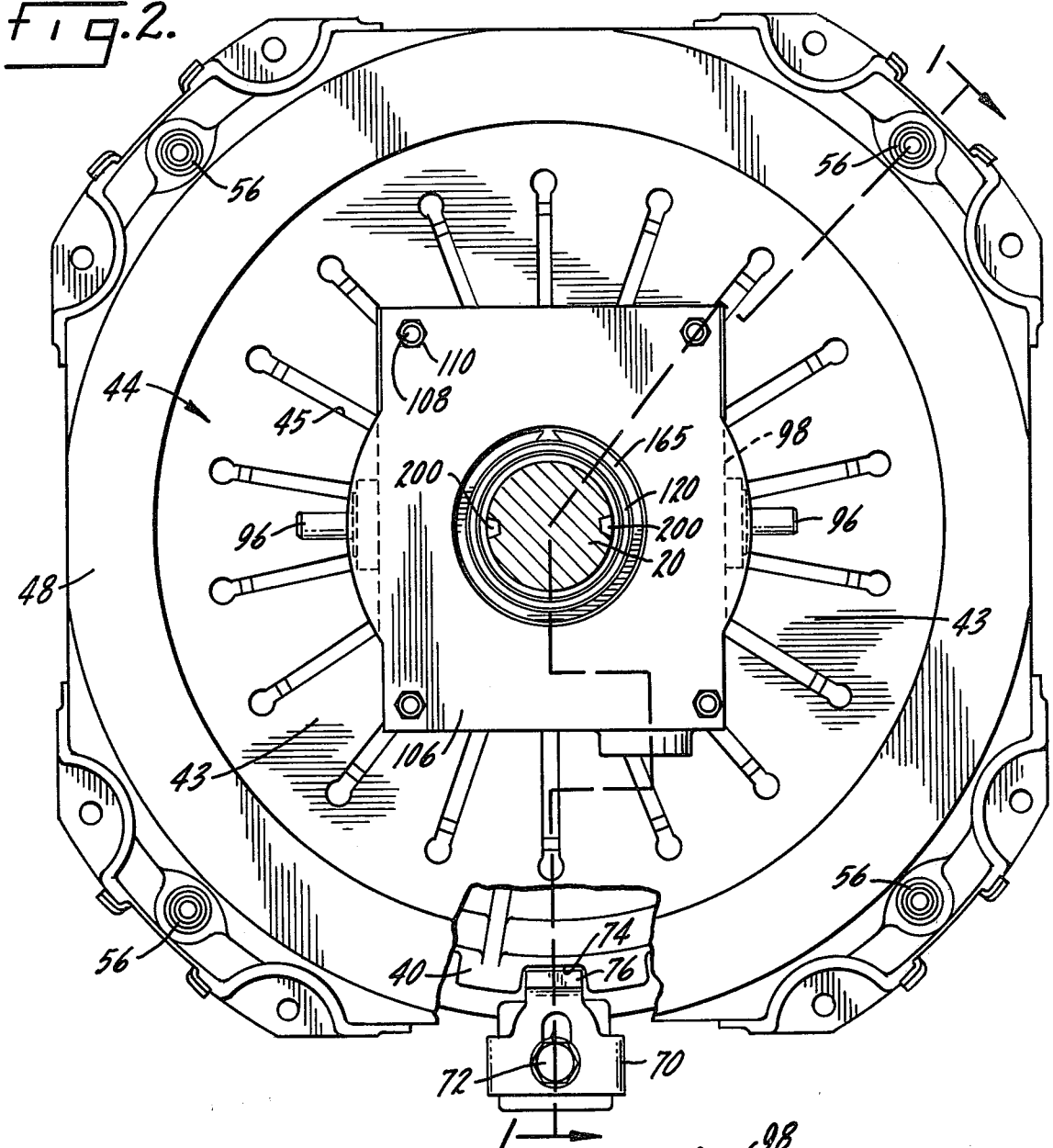
FIG. 2 is a sectional view taken along the lines 2—2 of FIG. 1.

The inner clutch discs 32 are splined to a driven hub 60 which in turn is connected to splines 62 formed on input shaft 20. Clutch hub 60 has a drum portion 64 which has mounted thereto a pair of retainer plates 66 and 68 on either side thereof adapted to retain the clutch plates within the assembly by extending radially outwardly beyond the outer diameter of drum 64. Also provided connected to pressure plate 34 is a locking lug 70 secured to pressure plate 34 by bolts 72, for example. Referring to FIG. 2, it will be seen that the pressure plate has a series of radial grooves 74 which are engageable by a nose portion 76 on locking lug 70. The position of the pressure plate relative to spring 44 may be easily adjusted during the life of the clutch by loosening bolts 72, pulling locking lug 70 outwardly so that it disengages one of the slots 74, then rotating the clutch ring 40 on the nose portion 36 to provide an adjustment of the contact between clutch ring 40 and thus pressure plate 34 and spring 44.

In general, from the above it can be seen that clutch section 12 is adapted to be engaged by spring 44 flexing in a direction to move pressure plate 34 to the left as viewed in FIG. 1 and engaging the interleaved discs 30 and 32 to provide a driving connection between flywheel 18 and driven hub 60 and thus to transmission input shaft 20. Return springs 56 serve to hold pressure plate 34 against spring 44 so that the position of spring 44 will determine the position of pressure plate 34, and when the inner end of spring 44 is moved to the right, as viewed in FIG. 1, spring 44 will pivot about its outer peripheral diameter 52 on pivot ring 54, and pressure plate 34 will follow this movement and release the driving connection between the clutch discs 30 and 32.

Near the inner diameter of spring 44, slots 45 are intercepted by a series of drive lugs 80 formed in a sheet metal drive plate 81 which is mounted on a release sleeve 82. Release sleeve 82 has drive plate 81 secured thereto by rivets 84. An annular spacer ring 86 is mounted around an annular retainer spring 88, retainer spring 88 receiving the inner diameter of spring 44. Retainer spring 88 is secured to release sleeve 82 by snap ring 90.

Release mechanism 14, which can be considered to include release sleeve 82, is operated by a release yoke 92 mounted on a drive shaft 93. Yoke 92 has arms 94 extending on either side of release mechanism 14, arms 94 connected to a pair of pinion blocks 96 mounted on yoke arms 94 and contacting pump body 98 as more particularly shown in U.S. Pat. No. 3,314,513 of common assignee. Pump body 98 is comprised of a pump housing 100 and a pump cover 102. Pump body 98 is mounted between a pair of plates comprised of a valve plate 104 and a brake plate 106. Plates 104 and 106 are rigidly connected by a spacer 108 which is threadably secured in valve plate 104 and is secured in brake plate 106 by bolts 110. Concentrically mounted within the interior of body 98 and release sleeve 82 is a pump sleeve 120. A pair of snap rings 121 and 123 are connected to pump sleeve 120 receiving release sleeve 82 therebetween to prevent any relative axial movement between sleeve 82 and sleeve 120.

In general, when lever or release yoke 92 is pivoted, pump body 98 will move axially with respect to the transmission input shaft 20 and plates 104, 106, pump sleeve 120, and release sleeve 82 will move axially therewith due to the interconnections between the various parts as will be described.

Mounted between pump housing 100 and brake plate 106 is a Belleville spring 122 which will urge body 98 to the left as viewed in FIG. 1 with respect to plates 104, 106. Pump body 98 comprised of pump housing 100 and pump cover 102 is mounted on pump sleeve 120. The pump body 98 and plates 104 and 106 are stationary members within the clutch housing 10 while the clutch release sleeve 82 and the pump sleeve 120 are rotating members. Release sleeve 82 is driven by spring 44 which is driven by the engine and the flywheel 18. Release sleeve 82 is keyed to pump sleeve 120 through a key 130 and thereby rotates the pump sleeve 120.

Mounted within pump cover 102 is an internal-external pump assembly 132 comprised of an inner pump gear 134 keyed to pump sleeve 120 to be driven thereby by a key 136. Inner gear 134 meshes with an outer gear 135. Since the outer gear 135 is stationary being fixedly secured within pump cover 102 and the inner gear 134 rotates with pump sleeve 120, the pump will be operational and rotate whenever the engine of the vehicle is rotating and turning flywheel 18.

Figure 3:
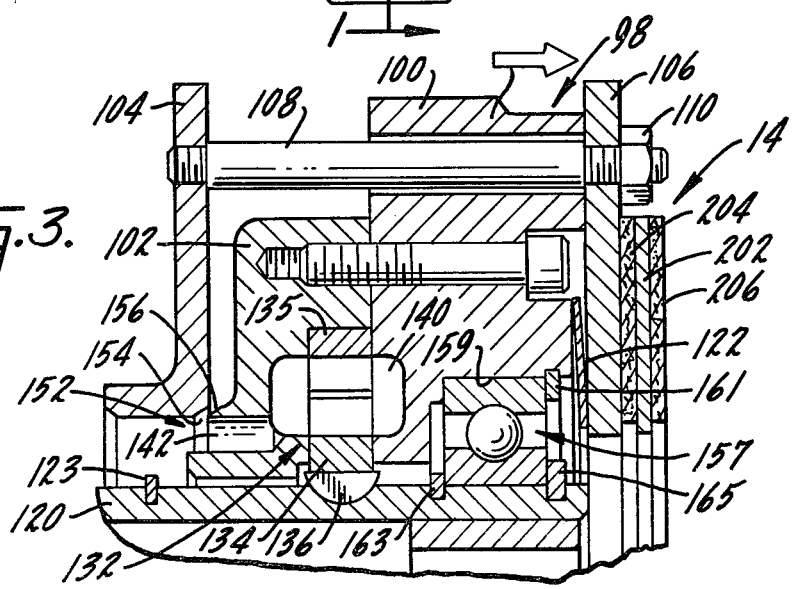
FIG. 3 is an enlarged view of the release mechanism shown in FIG. 1.

Referring specifically to FIG. 3, the release mechanism 14 is shown enlarged and in greater detail. The pump 132 has an outlet chamber 140 defined by ports in pump housing 100 and pump cover 102. Outlet chamber 140 is connected to an axial outlet passage 142 in pump cover 102. Outlet passage 142 is connected through a passage 144 defined by the space between pump sleeve 120 and release sleeve 82 to an inner area 146 internal of release sleeve 82. Area 146 opens into an oil receiving chamber 148 which is generally defined by drum portion 64 and disc retainer 68. Radial holes, not illustrated, are provided through the drum portion 64 to conduct lubricating fluid from the chamber 148 between clutch discs 30 and 32 to cool and lubricate the discs.

As illustrated in FIG. 1, a fluid inlet chamber 141 is defined for pump 132 by ports in pump housing 100 and pump cover 102. A radial inlet port 143 is provided in pump housing 100 which is connected to inlet chamber 141. A supply hose 145 is connected to port 143 to conduct fluid from the sump to pump 132.

As best illustrated in FIG. 3, an annular dump valve 152 is provided in operative 152 with the pump outlet passage 142. The dump valve 153 is defined by a pair of engaging annular surfaces 154 and 156 provided on the valve plate 104 and the pump cover 102, respectively. Surfaces 154 and 156 are angularly disposed in a generally conical orientation to insure a good sealing engagement when the surfaces are forced together. As will be described in more detail, the valve 152 has an open position as illustrated in FIG. 3 and a closed position as illustrated in FIG. 1. When the valve 152 is closed as illustrated in FIG. 1, all fluid pumped by pump 132 through passage 142 will be conducted to the chamber 148 and flow through the clutch plates to lubricate and cool same. However, when the valve 152 is open as viewed in FIG. 3, due to centrifugal force and the great passage area defined by a passage of an annular type as created when valve 152 is open, substantially all of the fluid being pumped will flow through the open valve 152 and then to the sump for the clutch.

Also illustrated in FIG. 3, the pump housing 100 receives a ball bearing 157 in a bore 159 therein. Bearing 157 rotatably journals pump sleeve 120 within housing 100. A snap ring 161 retains bearing 157 in bore 159. A pair of snap rings 163 and 165 are secured to pump sleeve 120 and receive bearing 157 therebetween whereby relative axial movement between pump body 98 and pump sleeve 120 is prevented.

The brake mechanism 16 for transmission input shaft 20 is provided on the right side of the clutch housing as illustrated in FIG. 1 and is comprised of a brake stop ring 190 which is threadably received upon an inner annular hub 192 of clutch housing 24. Brake stop ring 190 has a slot 194 therein engaged by brake locking lug 196 secured to housing 24 by bolts 198, for example. Input shaft 20 has a pair of elongated splines 200 on either side thereof which extend to the area of brake mechanism 16. Brake mechanism 16 further includes a brake disc 202 mounted on shaft 20 and splined to splines 200 to be driven thereby. Brake disc 202 has friction surfaces 204 and 206 on the outer portions thereof which are adapted to engage with brake stop ring 190. Brake 16 is engaged when brake plate 106 engages brake disc 202 and forces brake disc 202 against stop ring 190.

The operation of the unique clutch mechanism of the present invention is as follows. When the clutch pedal of the vehicle in which the clutch mechanism 10 is mounted is released, diaphragm spring 44 will pivot at pivot ring 54 in back plate 48 to force adjusting ring 40 and pressure plate 34 toward flywheel 18 against the force of return springs 56. At the same time, the inner diameter of diaphragm spring 44 will move release sleeve 82 and body 98 and plates 104 and 106 to the left as viewed in FIG. 1 away from brake mechanism 16. Pressure plate 34 then moves to squeeze clutch discs 30 and 32 together to create a power transmitting connection between the engine and the transmission through transmission input shaft 20.

As is known in wet clutch structures, the function of the oil flow provided by pump mechanism 132, for example, is to dissipate heat created by friction. Secondly, the function of the oil is lubrication of the parts of the clutch to reduce friction and wear to extend clutch life. Gear pump 132 may be of any known internal/external type and is driven by the engine and the flywheel 18 at all times at engine speed by means of back plate 48, diaphragm spring 44, drive plate 81 and release sleeve 82. Thus, the pump provides a continuous flow of oil whenever the engine of the vehicle is running. Oil is drawn by the pump from the sump through suction hose 145 and may, for example, create an oil flow at the rate of approximately four gallons per 1,000 rpm.

When the clutch 10 is engaged as previously described, oil is discharged through the inner portion of release sleeve 82 into chamber 148 where centrifugal force causes the oil to flow through radial ports in driven hub 60 into the area of the clutch discs 30 and 32 and then through appropriate ports in the cover assembly to the sump. As oil passes through the area of the clutch discs 30 and 32, heat is transferred from the plates to the oil. The oil is cooled in the sump and then recirculated through the clutch by pump 132.

When the clutch pedal is operated to release clutch 10, the clutch disengagement is accomplished by means of an external linkage connected to release yoke 92. When yoke 92 pivots, it will move release mechanism 14, including pump body 98, plates 104 and 106, and the release sleeve 82 to the right as viewed in FIG. 1. As release sleeve 82 is moved to the right, the inner diameter of the diaphragm spring 44 moves to the right pivoting about its outer diameter. Return springs 56 pull pressure plate 34 and ring 40 to the right and hold ring 40 in contact with the diaphragm spring. Discs 30 and 32 separate and power is no longer transmitted from the engine to the transmission input shaft 20. Clutch 12 becomes fully disengaged when brake plate 106 is moved to the right far enough to squeeze brake disc 202 against brake stop ring 190 and compress Belleville spring 122. Movement of the plates 104 and 106 toward the right stops when plate 106 squeezes the brake disc 202 against brake stop ring 192. However, pump body 98 continues to move to the right, as moved by yoke 92, the Belleville spring 122 being compressed between plate 106 and pump body 98 and relative movement taking place between the pump body and the plate 106 which opens dump valve 152 as illustrated in FIG. 3.

As previously described, dump valve 152 is annular in configuration and provides a large passage area so that substantially all of the fluid flow from pump 132 through outlet passage 142 will be diverted through dump valve 152 at the time it is open. This escape of oil through the valve 152 eliminates any viscous drag which would occur between clutch discs 30 and 32 and thereby eliminates unwanted rotational drive effort between the clutch plates.

When brake plate 106 squeezes brake disc 202 against stop ring 190 and Belleville spring 122 is fully compressed, a braking action is created stopping rotation of the transmission input shaft 20 which will allow the operator of the vehicle to shift, for example, from the neutral condition to first or reverse gear without gear clash or other problems due to inertia of rotating parts. Uniquely, the compressed Belleville spring creates a torque limiting brake which will allow slippage of brake disc 202 relative to stop ring 190 when excess of torque requirements are present. When the squeeze against brake disc 202 is relieved, Belleville spring 122 will again force pump body 98 toward valve plate 104 closing dump valve 152 by engagement of surfaces 154 and 156. Thus at this time, oil will be redirected to clutch discs 30 and 32 to cool and lubricate same.

Referring to FIG. 4, an optional form of release mechanism 14 is illustrated. Like elements of the structure of FIG. 4 to those elements of FIGS. 1, 2 and 3 carry the same numerals with the addition of the suffix "a". In the release mechanism 14a of FIG. 4, there is no pump. A radial inlet port 302 is provided in the body 300 to which will be connected an external supply of pressurized lubricant and cooling fluid. Port 302 is connected by a passage 304 to a pressure groove 306. Similar to the construction of FIG. 1, the pressurized fluid will then flow from chamber 306 through passage 308 defined between pump sleeve 120a and transmission input shaft 20a to then flow to the clutch discs 30 and 32 in a manner as described with respect to the structure of FIG. 1.

Only one plate 104a is provided in the structure of FIG. 4 comprising a valve plate. Valve plate 104a has secured thereto spacers 108a which have on the other end a nut 310 secured thereto. Between nut 310 and body 300 is a coil spring 312 creating a force tending to pull valve plate 104a toward body 300 for purposes as will be described. Pump body 300 has a circular sealing ridge 320 having a radial sealing surface 322 thereon. Adjacent the ridge 320, valve plate 104a has a radially extending sealing surface 324. Surfaces 322 and 324 together form a dump valve 326.

The operation of the device of FIG. 4 is similar to that of FIG. 1 in that when release mechanism 14a is moved to the right, at some point the spacers 108a will contact a stationary member such as the clutch housing wall and/or lugs 196 pictured in FIG. 1. When this happens, the body 300 continues to move to the right and the spacer 108a and the valve plate 104a are stationary. The dump valve 326 will open and will dump all fluid pressure through a passage defined by an opening between surfaces 322 and 324 to divert all oil flow from the clutch discs 30 and 32 for the same reasons as described above with regard to FIG. 1.

The advantage of the structure of FIG. 4 is that by using various length of spacers 108a, the dump valve can be opened at different times depending upon the requirements of the particular installation in which the clutch 10 is to be utilized. For example, the dump valve could open before the brake is fully engaged which is known to be desirable in certain installations to prevent torque from being locked up within the system when the brake mechanism 16 is applied.

What is claimed is:

1. A clutch mechanism having an input and output means, a plurality of friction elements associated with said input and output means providing a releasable driving connection therebetween, a sleeve rotating with said input means, release mechanism connected to said sleeve, fluid means in said release mechanism, pivotal means connected to said release mechanism and actuatable to move said release mechanism relative to said friction means to release said driving connection, passage means in said release mechanism to conduct fluid from said fluid means to said friction elements to lubricate and cool same, valve means in said passage means, said valve means operable in response to movement of said release mechanism in a releasing direction to divert fluid flow from said friction elements to prevent drive between said friction elements due to viscous drag said release mechanism includes a body member mounted between a pair of rigidly connected plates, said valve means being defined by annular engaging surfaces on said body and one of said plates, said body being axially movable relative to said plates, stop means for said release mechanism whereby when said plates contact said stop means said body will move relative to said plates to open said valve means by disengagement of said surfaces 2. A clutch mechanism as in claim 1 wherein said stop means comprises a brake mechanism for said output means engageable by said release mechanism.

3. A clutch mechanism as in claim 1 including spring means between said body and said plates resisting relative movement of said body and plates in a direction tending to separate said surfaces.

4. A clutch mechanism as in claim 3 wherein said spring means comprises a Belleville spring between said body and one of said plates.

5. A clutch mechanism having an input means and an output means, a plurality of friction elements associated with said input and output means providing a releasable driving connection therebetween, a sleeve rotating with said input means, release mechanism connected to said sleeve, fluid pumping means in said release mechanism, pivotal means connected to said release mechanism and actuatable to move said release mechanism relative to said friction means to release said driving connection, passage means in said release mechanism to conduct fluid from said pumping means to said friction elements to lubricate and cool same, annular valve means in said passage means, said valve means having means defining a fluid passage therethrough in response to movement of said release mechanism in a releasing direction to divert flow through said fluid passage and from said friction elements to prevent drive between said friction elements due to viscous drag.

6. A clutch mechanism as in claim 5 wherein said release mechanism includes a body member mounted between a pair of rigidly connected plates, said annular valve means being defined by annular engaging surfaces on said body and said plates, said body being axially movable relative to said plates, stop means for said release mechanism whereby when said plates contact said stop means said body will move relative to said plates to disengage said surfaces and open said valve means.

7. A clutch mechanism as in claim 6 including a Belleville spring between said body and said plates resisting relative movement of said body and plates in a direction tending to separate said surfaces.

8. A clutch mechanism having an input means and an output shaft, a plurality of friction discs in said clutch providing a releasable driving connection between said input means and output shaft, a sleeve rotating with said input means, release mechanism connected to said sleeve, a fluid pump in said release mechanism, pivotal means connected to said release mechanism and actuatable to move said release mechanism relative to said friction discs to release said driving connection, passage means in said release mechanism to conduct fluid from said pump to said friction discs to lubricate and cool same, annular valve means in said passage means, said valve means comprising a pair of annular surfaces separable in response to movement of said release mechanism in a releasing direction to divert fluid flow from said friction elements to prevent drive between said friction elements due to viscous drag when the clutch is disengaged, said release mechanism including a pump body mounted between a pair of vertically disposed rigidly connected plates, one of said annular surfaces being on said body and one of said annular surfaces being on one of said plates, said body being axially movable relative to said plates, stop means for said release mechanism whereby when said plates contact said stop means said body will move relative to said plates to disengage said surfaces.

9. A clutch mechanism as in claim 8 including a Belleville spring between said body and said plates resisting relative movement of said body and plates in a direction tending to separate said surfaces.

10. A clutch mechanism as claimed in claim 1 wherein said fluid means includes a pressure source outside of and connected to said release mechanism.

11. A clutch mechanism as in claim 10 wherein said release mechanism includes a body member having a valve plate associated therewith, said valve means being defined by engaging surfaces on said body and said plate, said body being axially movable relative to said plate, stop means on said plate, adjustable means on said plate whereby when said plate contacts said stop means said body will move relative to said plate to open said valve means by disengagement of said surfaces.

* * * * *